US007391588B2

(12) United States Patent
Cho et al.

(10) Patent No.: US 7,391,588 B2
(45) Date of Patent: Jun. 24, 2008

(54) HARD DISK DRIVE CONNECTOR HAVING CONNECTOR PINS THAT DEFORM AWAY FROM A CENTRAL SHORTING POST IN RESPONSE TO AN EXTERNAL FORCE

(75) Inventors: Kyoung-man Cho, Seoul (KR); Jae-suk Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/442,238

(22) Filed: May 30, 2006

(65) Prior Publication Data

US 2006/0292899 A1 Dec. 28, 2006

(30) Foreign Application Priority Data

Jun. 27, 2005 (KR) ...................... 10-2005-0055890

(51) Int. Cl.
*G11B 33/00* (2006.01)
*H01R 12/00* (2006.01)
*H01R 29/00* (2006.01)

(52) U.S. Cl. ..................................... 360/97.01; 439/188

(58) Field of Classification Search .............. 360/97.01, 360/98.01; 439/188
See application file for complete search history.

(56) References Cited

U.S. PATENT DOCUMENTS

RE33,831 E * 2/1992 Boland ........................ 439/260
5,316,486 A * 5/1994 Tanaka et al. .................. 439/62
6,022,236 A * 2/2000 McHugh et al. ............. 439/342
6,056,590 A * 5/2000 Takahashi et al. ........... 439/489
6,174,183 B1 * 1/2001 Ono et al. .................... 439/188
6,398,590 B2 * 6/2002 Banas et al. ................ 439/668
6,482,050 B1 * 11/2002 Lemke et al. ............... 439/856
6,557,761 B1 * 5/2003 Oya et al. ................... 235/441
6,618,261 B1 * 9/2003 Gaboury et al. ............. 361/752
6,794,589 B2 * 9/2004 Kubat et al. ................. 200/6 A
6,945,801 B2 * 9/2005 Brown ......................... 439/188
6,979,785 B2 * 12/2005 Yamasaki ................... 200/6 A
7,029,285 B2 * 4/2006 Abe ............................ 439/62
7,052,284 B2 * 5/2006 Liao et al. ...................... 439/66
7,102,088 B2 * 9/2006 Tan et al. .................... 200/6 A
7,247,039 B2 * 7/2007 Annecke et al. ............. 439/188
2006/0110964 A1 * 5/2006 Kamath ...................... 439/188

FOREIGN PATENT DOCUMENTS

JP 07-201421 8/1995
JP 08-180943 7/1996
JP 2004-207165 7/2004

* cited by examiner

*Primary Examiner*—Jefferson Evans
(74) *Attorney, Agent, or Firm*—Staas & Halsey LLP

(57) ABSTRACT

A connector, and a hard disk drive having the connector, the connector including connecting pins arranges so as to be spaced apart from one another; and a connecting member to contact the connecting pins and cause an electrical short in response to no external force being applied to the connecting pins; wherein the electrical short is removed in response to an external force being applied to the connecting pins. The connecting pins are moved so as not to contact the connecting member in response to an external force being applied to the connecting pins.

19 Claims, 7 Drawing Sheets

HARD DISK DRIVE CONNECTOR HAVING CONNECTOR PINS THAT DEFORM AWAY FROM A CENTRAL SHORTING POST IN RESPONSE TO AN EXTERNAL FORCE

CROSS-REFERENCE TO RELATED APPLICATIONS

This application claims the benefit of Korean Patent Application No. 10-2005-0055890, filed on Jun. 27, 2005, in the Korean Intellectual Property Office, the disclosure of which is incorporated herein by reference.

BACKGROUND OF THE INVENTION

1. Field of the Invention

The present invention relates to a hard disk drive, and, more particularly, to a connector connecting a flexible printed cable and a main circuit board, and a hard disk drive including the same.

2. Description of the Related Art

A hard disk drive is an example of an auxiliary memory unit which may be used in computers, etc. These devices are used to read data stored in disks, or to write new data to disks, by means of a magnetic head. The magnetic head is mounted on a slider so that, upon operating, it rises from the disk to reproduce data stored in the disk through reading it, or otherwise to write new data to the disk. Data on the disk that the magnetic head reads are converted into electric signals and transferred to a main circuit board via a flexible printed cable connected to the magnetic head. In addition, electric signals corresponding to data to be written to the disk are transferred from the main circuit board to the magnetic head via the flexible printed cable. The flexible printed cable and the main circuit board are connected to each other by means of a connector.

FIG. 1 illustrates an example of a connector provided in a hard disk drive according to the prior art.

The connector 10 as illustrated in the drawing includes a bracket 11 and a plurality of connecting pins 12 mounted in the bracket 11. The bracket 11 is made from an insulating material, and the connecting pins 12 are made from a conductive material. The connecting pins 12 are arranged in two rows and spaced apart from each other so as not to contact each other. First ends of the connecting pins 12 are positioned to protrude at a certain height from the bracket 11, so that these first ends are connected with terminals provided in the main circuit board with a relation of one-to-one correspondence. Further, the second ends of the connecting pins 12 are positioned opposite to the main circuit board so as to connect with the flexible printed cable.

The connector 10 as configured above has a problem in that, since the connecting pins 12 are exposed before connection with the main circuit board, electric current may flow via the flexible printed cable from the exposed portions to damage the magnetic head. To prevent this, according to the prior art, a short block 1 is mounted to the connector 10 in order to short between the connecting pins 12.

The short block 1 comprises a conductive material, and, as illustrated in FIG. 2, is formed in a rib shape such that it is inserted between the connecting pins 12 to contact them. Such a short block 1 electrically connects all of the connecting pins 12, so that the connecting pins 12 can be shorted. The short block 1 mounted as discussed above should be removed before the connection of the connector 10 with the main circuit board, or for a servo track writing performed before the connection with the main circuit board. Herein, the servo track writing is an operation that previously records a servo signal on the disk in order to write information on the hard disk drive, or to read stored information.

However, to remove the short block from the connector as described above, an additional process is required, and if the servo track writing is performed without removing the short block, errors in the operation may be caused. Further, in the course of removing the short block from the connector, the connecting pins may be bent, which could result in an incomplete connection between the connector and the main circuit board.

SUMMARY OF THE INVENTION

The present invention provides hard disk drives in which a short block is not needed for an electrical short between the connecting pins, thus reducing the number of processes involved and to improve connectivity to a main circuit board.

Additional aspects and/or advantages of the invention will be set forth in part in the description which follows and, in part, will be apparent from the description, or may be learned by practice of the invention.

According to an aspect of the present invention, there is provided a connector including a bracket comprising an insulating material; connecting pins arranged in the bracket so as to be spaced apart from one another, and comprising a conductive material; and a common connecting portion extending in a direction that the connecting pins are arranged, and comprising a conductive material, wherein the connecting pins all contact the common connecting portion to form short circuits before an external force is applied thereto, and the connecting pins each are resiliently deformed to be spaced apart from the common connecting portion in response to an external force being applied.

According to another aspect of the present invention, there is provided a hard disk drive including a base member; at least one disk rotatably mounted on the base member; a head stack assembly rotatably mounted on the base member to record data on the disk and to read data recorded on the disk; a voice coil motor to provide the head stack assembly with a rotating force using interaction with a coil provided in the head stack assembly; and a connector to connect between the head stack assembly and a main circuit board controlling the same, the connector comprising a bracket comprising an insulating material, connecting pins arranged in the bracket so as to be spaced apart from one another, and comprising a conductive material, and a common connecting portion extending in a direction that the connecting pins are arranged, and comprising a conductive material, wherein the connecting pins all contact the common connecting portion to form electrical shorts before the connecting pins are connected to the main circuit board, and the connecting pins each are resiliently deformed to be spaced apart from the common connecting portion in response to the connecting pins being connected to the main circuit board.

According to another aspect of the present invention, there is provided a connector comprising connecting pins arranges so as to be spaced apart from one another; and a connecting member to contact the connecting pins and cause an electrical short in response to no external force being applied to the connecting pins; wherein the electrical short is removed in response to an external force being applied to the connecting pins.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
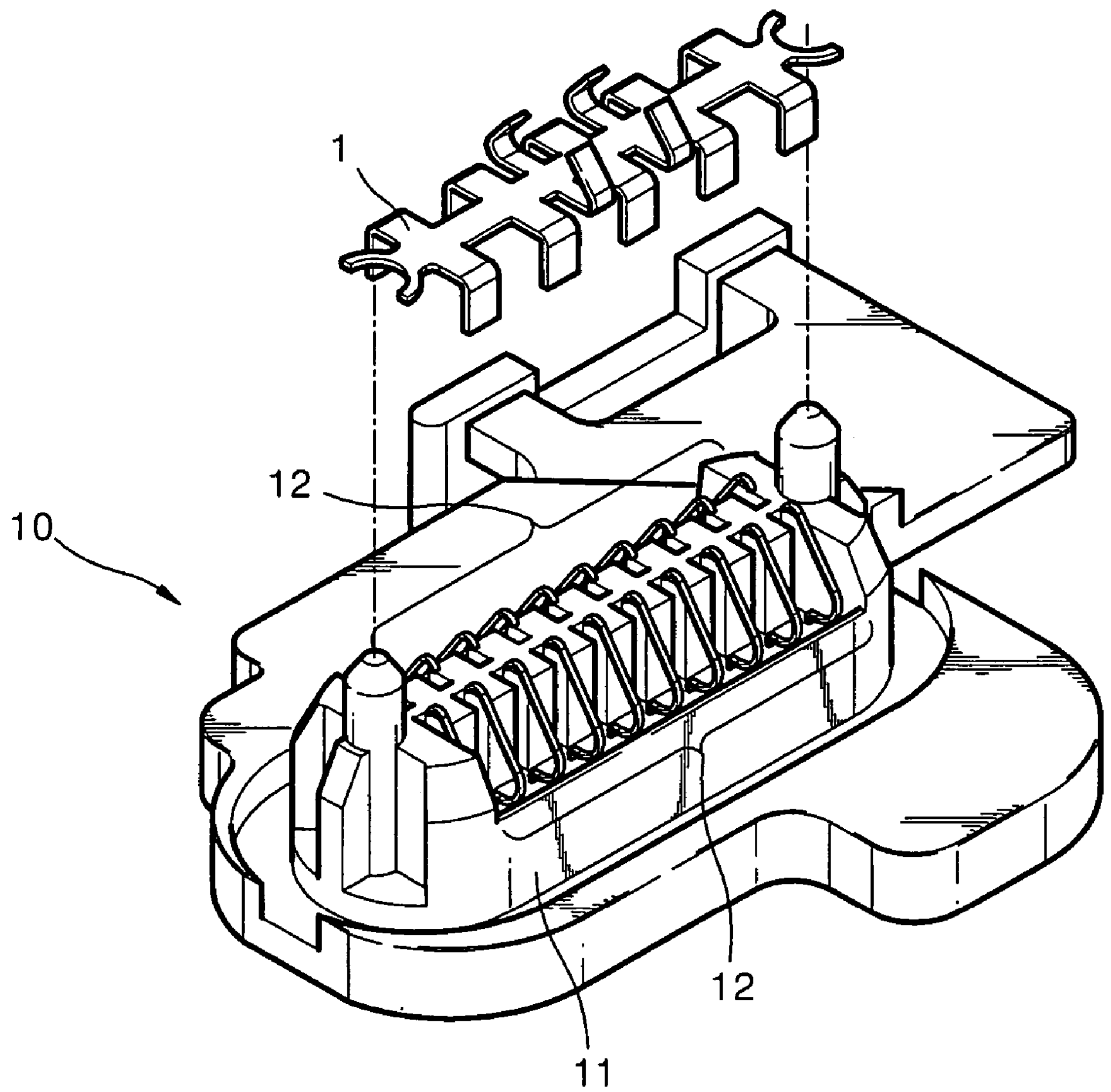
FIG. 1 (PRIOR ART)
FIG. 1 is a perspective view illustrating an example of a connector provided in a hard disk drive according to the prior art.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
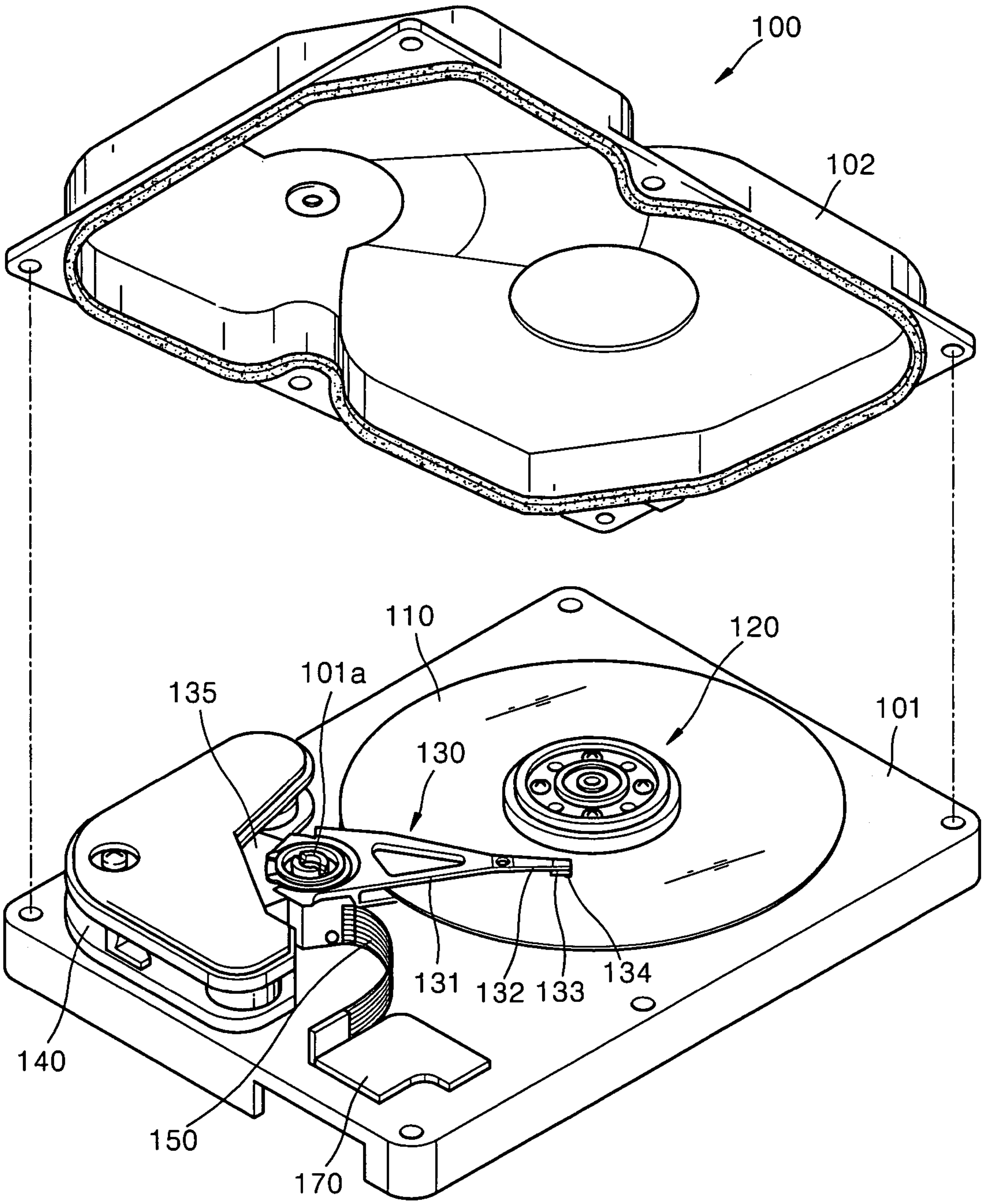
FIGS. 3 and 4 are exploded perspective views illustrating the upper and lower portions, respectively, of a hard disk drive according to an embodiment of the present invention.
Figure 4:
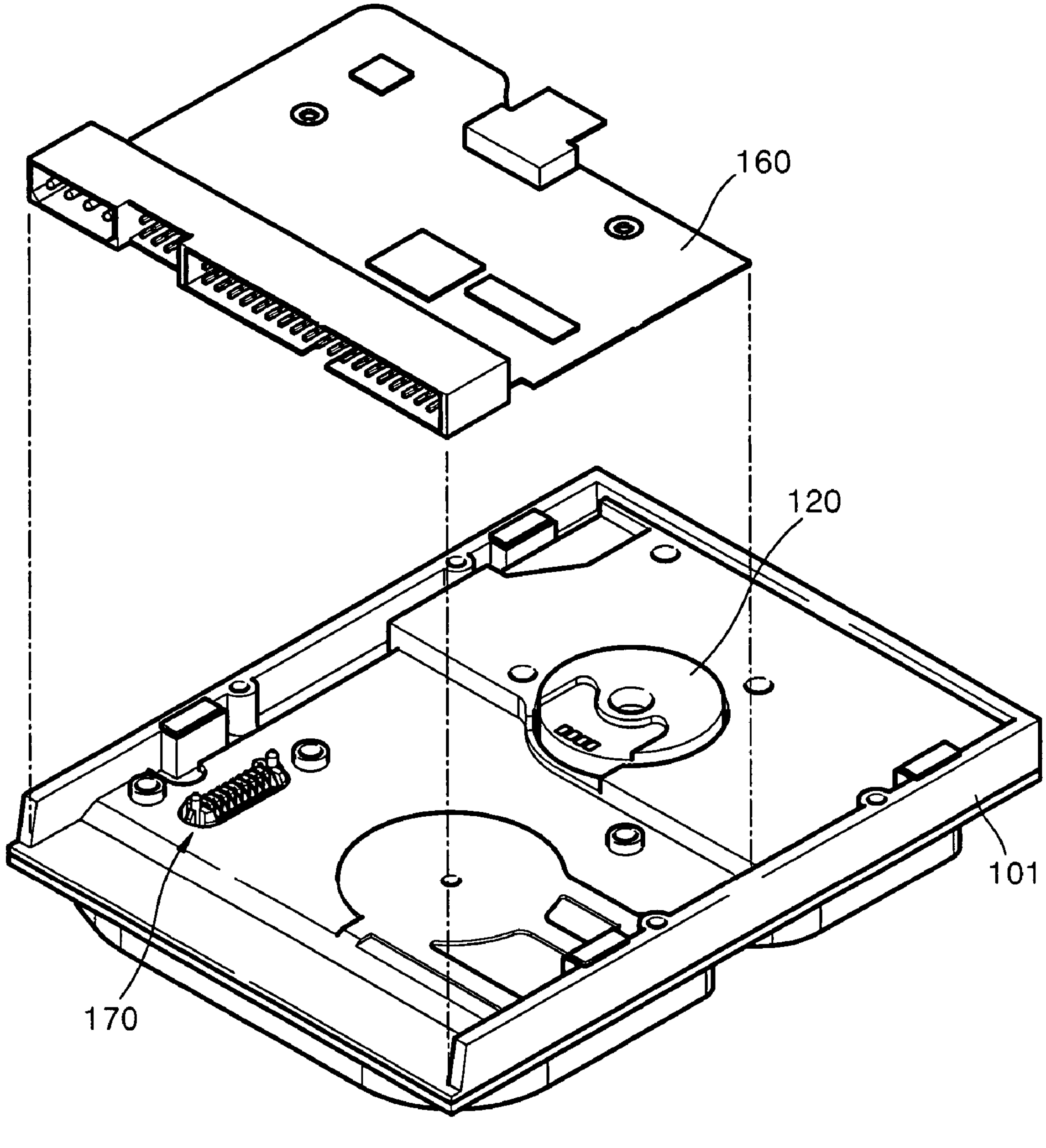

FIG. 3 is an exploded perspective view illustrating an upper portion of a hard disk drive according to the present invention, and FIG. 4 is an exploded perspective view illustrating a lower portion of the hard disk drive of FIG. 3.

Referring to FIG. 3, the hard disk drive 100 of the present invention includes a base member 101 and a cover member 102 coupled together to form a sealed inner space therebetween. In the inner space, there is one or more disks 110 of data recording medium, a spindle motor 120, a head stack assembly 130, and a voice coil motor 140.

The base member 101 and the cover member 102 may comprise, for example, stainless steel or aluminum, and may be coupled to each other by screws or other such adhesion methods. One or more disks 110 are mounted on the base member 101. The spindle motor 120 is a device to rotate the disk 110, and is fixedly mounted to the base member 101.

The head stack assembly 130 is an element to record data on the disk 110, or to read recorded data, and is rotatably mounted about a pivot axis 101*a* of the base member 101. The head stack assembly 130 includes an arm 131 provided to the pivot axis 101*a*, a suspension 132 coupled to a free end of the arm 131, a slider 133 coupled to the suspension 132, and a magnetic head 134 provided to the slider 133 to record and read data. The suspension 132 supports the slider 133 such that the slider 133 is resiliently biased toward the surface of the disk 110.

The head stack assembly 130 is driven by the voice coil motor 140 provided to one side of the base member 101. The voice coil motor 140 provides the head stack assembly 130 with a rotating force using interaction with a coil provided in a fantail 135 of the head stack assembly 130. To be specific, when electric current is applied to the coil, the head stack assembly 130 is rotated in a direction in conformity with Fleming's left-hand rule by an interaction between a magnetic field formed by a magnet provided in the voice coil motor 140 and the electric current flowing through the coil.

Thus, the slider 133 provided to a leading end of the suspension 132 is moved toward the spindle motor 120 on the disk 110 or toward the circumference of the disk 110. That is, when the disk 110 begins to rotate with an operation of the hard disk drive 100, the voice coil motor 140 rotates the arm 131 to move the slider 133, to which the magnetic head is provided, over the data recording surface of the disk 110. The slider 133 rises up from the data recording surface of the disk 110 at a height balanced by a lift generated by the rotating disk 110 and a resilient force by the suspension 132. In this state, the magnetic head 134 provided to the slider 133 reads data from or records data to the data recording surface of the disk 110. When the hard disk drive 100 stops the rotation of the disk 110, the voice coil motor 140 rotates the arm 131 to move the slider 133, to which the magnetic head 134 is provided, away from the data recording surface of the disk 110.

Figure 5:
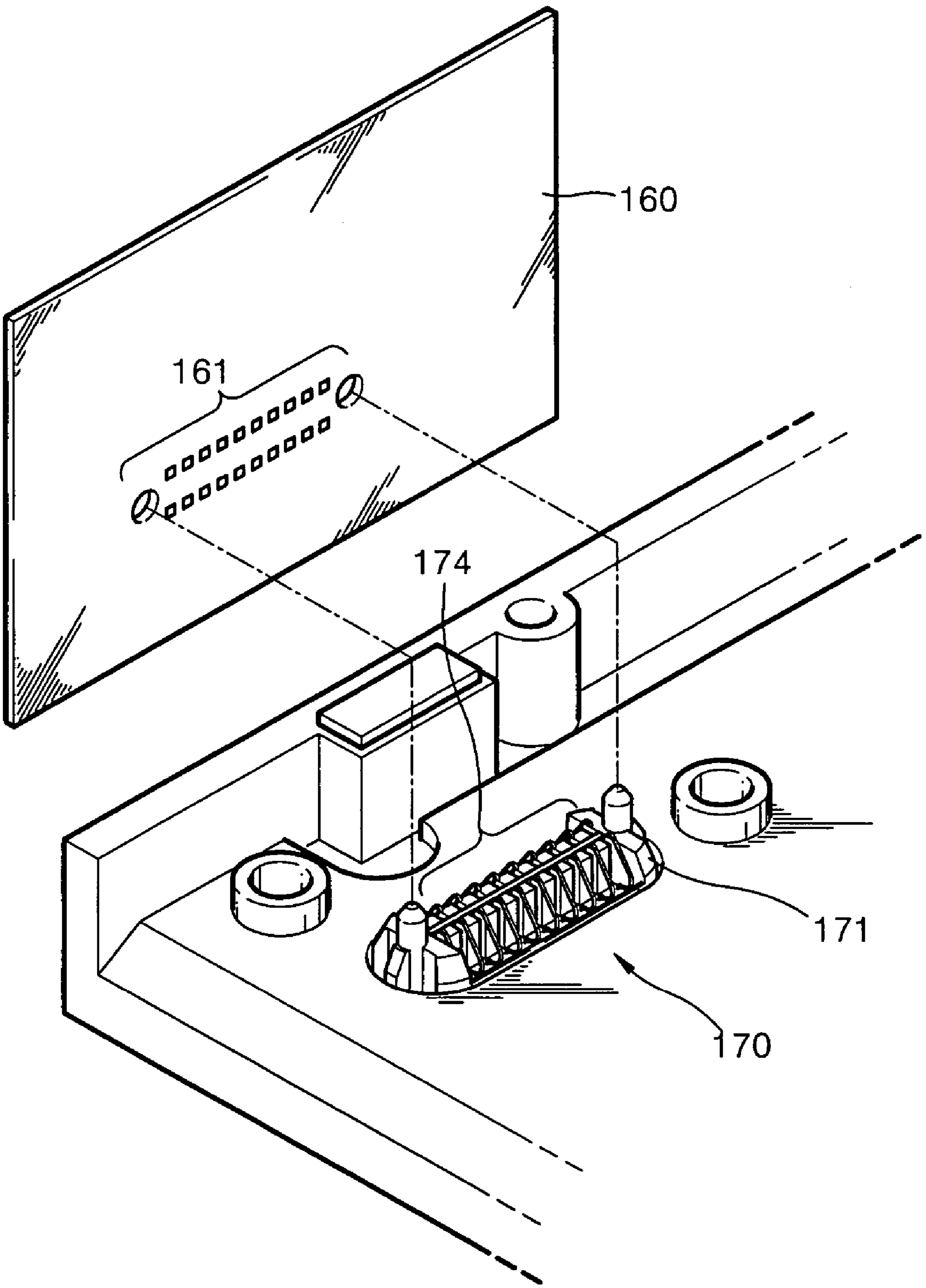
FIG. 5 is a partially enlarged perspective view illustrating a portion in FIG. 4.

A connector 170 is provided to a corner of one side of the base member 101. The connector 170 is connected with a flexible printed cable 150 connected with the head stack assembly 130, and, as illustrated in FIG. 4, passes through the base member 101 to protrude downwards, and is connected with a main circuit board 160 positioned under the base member 101. That is, the connector 170 is connected between the head stack assembly 130 and the main circuit board 160 to allow the head stack assembly 130 to be controlled by the main circuit board 160. Meanwhile, the main circuit board 160 is also used in controlling the voice coil motor 140. As illustrated in FIG. 5, the main circuit board 160 has terminals 161 to correspond on a one-to-one basis to the connecting pins 174 provided to the connector 170, which are described later. The terminals 161 each respectively contact the connecting pins 174 so that the main circuit board 160 and the connector 170 are connected with each other.

Figure 6:
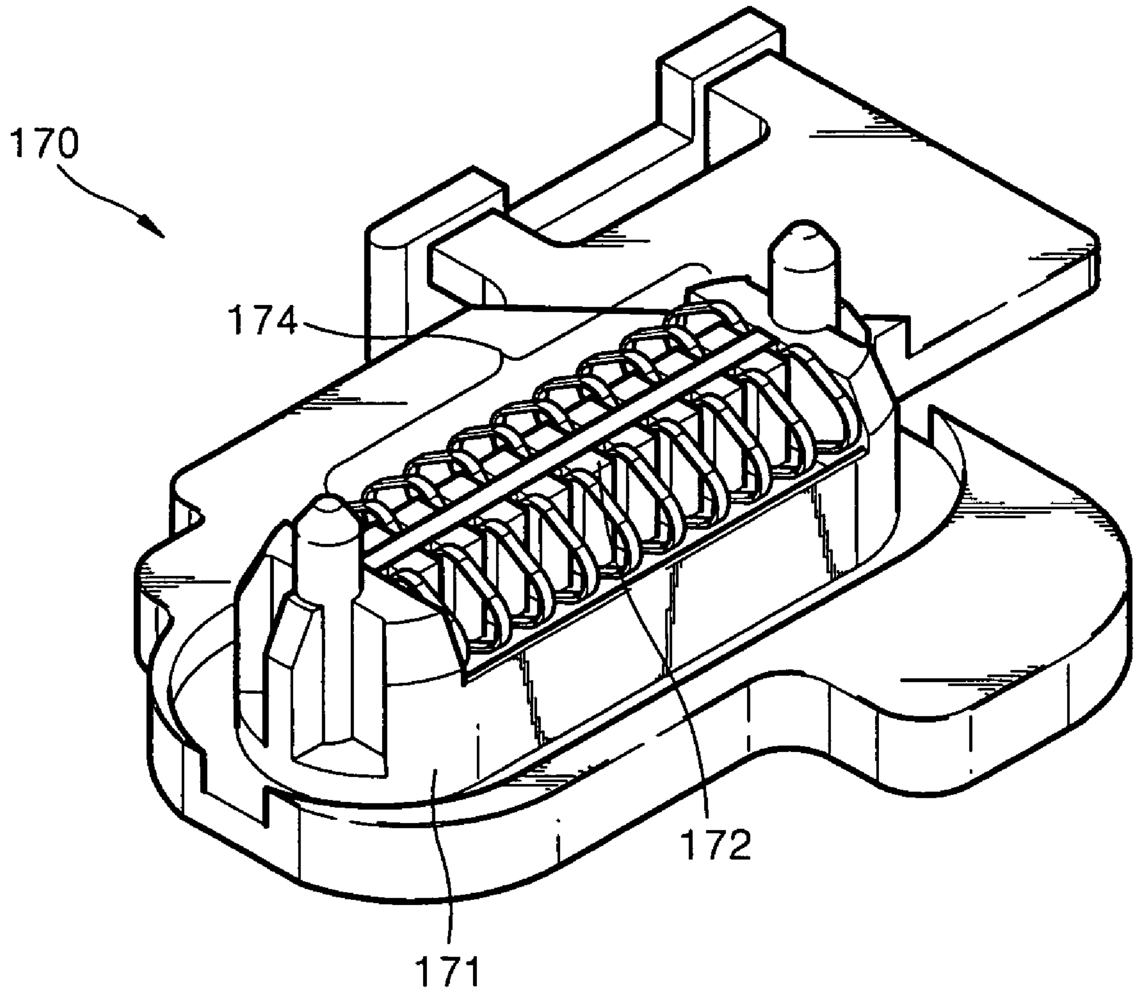
FIG. 6 is a perspective view illustrating the connector in FIG. 5.

The connector 170 will now be described in detail with reference to FIG. 6. The connector 170 as illustrated in FIG. 6 includes a bracket 171 comprising an insulating material, and connecting pins 174 provided in the bracket 171 and comprising a conductive material. Herein, the insulating material may be, for example, a resinous material, and the conductive material may be, for example, a metallic material. The connecting pins 174 provided in the bracket 171 are arranged in at least one row. The connecting pins 174 may be arranged parallel to each other in first and second rows. The connecting pins 174 are separated so as not to contact each other. In order to form a complete physical separation between the connecting pins 174, partition members such as partition walls 172 are preferably, though not necessarily, formed between each of the adjacent connecting pins 174. Such partition walls 172 may comprise an insulating material which may be integrally formed with the bracket 171.

Figure 7:
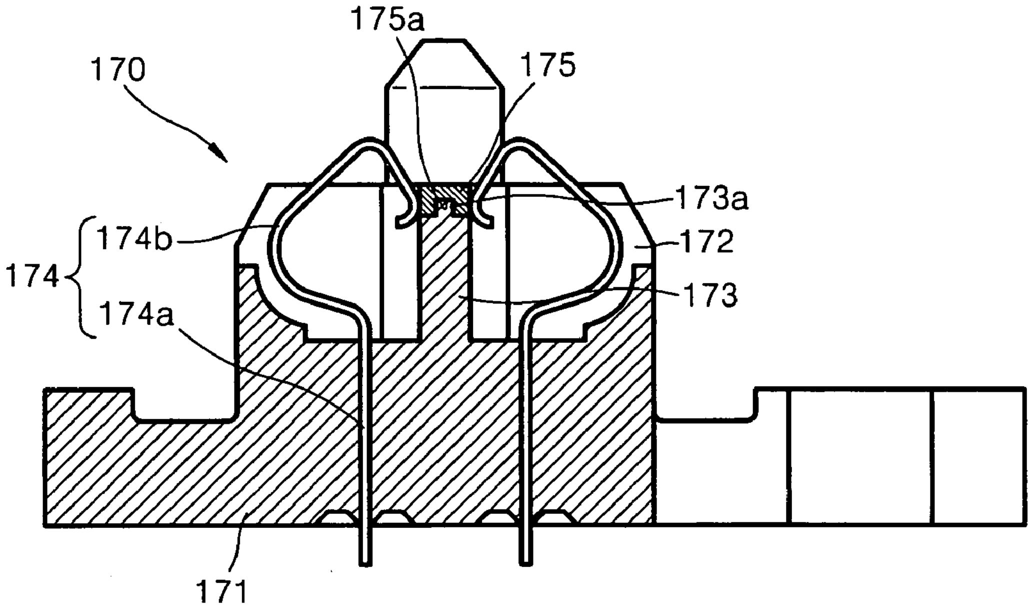
FIG. 7 illustrates a sectional view of FIG. 6.

The bracket 171 has a common connecting portion 175 extending in a direction in which the connecting pins 174 are arranged, and which may comprise a conductive material. The common connecting portion 175 is disposed between the first and second row of the connecting pins 174. The common connecting portion 175 contacts all of the connecting pins 174 before an external force is applied to the connecting pins 174, i.e., before the connection with the main circuit board 160, to cause a short between the rows of connecting pins 174. The common connecting portion 175 may be coupled to a block 173 provided to the bracket 171, which may comprise an insulating material, as illustrated in FIG. 7. The coupling of the block 173 and the common connecting portion 175 may be provided by one or more grooves 175*a* formed in the common connecting portion 175, and one or more protrusions 173*a* formed in the block 173 so as to be inserted into the grooves 175*a*. Also, it is possible to form protrusions in the common connecting portion 175, and form grooves in the block 173, so as to couple the common connecting portion 175 and the block 173.

As illustrated in FIG. 7, the connecting pins 174 contacting the common connecting portion 175 have hook portions 174*b* at portions exposed outside from their body portions 174*a* where a force is applied, so that edge portions of the hook portions 174*b* contact a side portion of the common connecting portion 175. Herein, in order to increase a contact area between the hook portions 174*b* and the common connecting portion 175, the edge portions of the hook portions 174*b* are preferably, though not necessarily, curved. Such hook portions 174*b* can be resiliently deformed while an external force is applied thereto along with the connection with the main circuit board 160. Also, the hook portions 174*b* can return to their original states if the external force is removed. In the event that the terminals 161 are formed in the main circuit board 160 as illustrated in FIG. 5, the hook portions 174*b* are preferably, though not necessarily, partially protruded from inside of the bracket 171 at a predetermined height so as to be resiliently deformed inside the bracket 171 while maintaining the contact state with the terminals 161. A shape of the hook portion 174*b* is not limited to these illustrated embodiments, but may be formed in various shapes to perform a function as described above.

Figure 2:
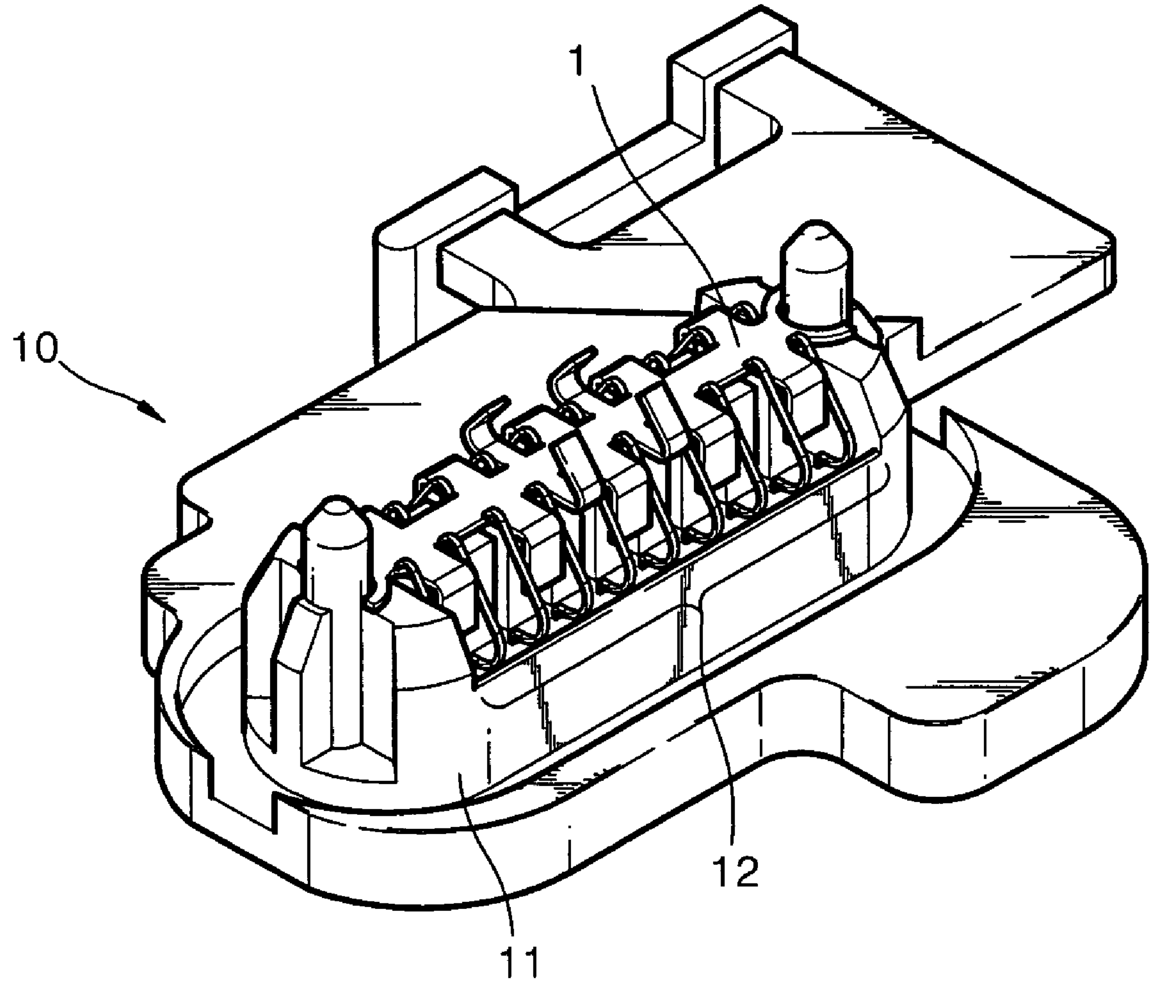
FIG. 2 (PRIOR ART)
FIG. 2 is a perspective view illustrating a state that a short block is mounted to the connector in FIG. 1.
Figure 8:
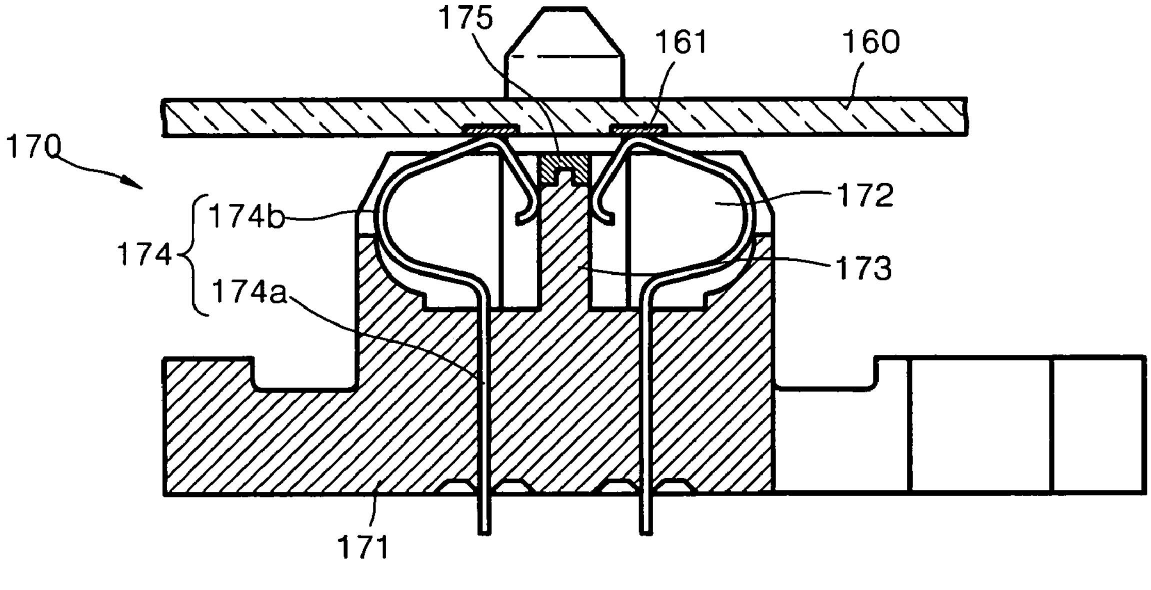
FIG. 8 is a sectional view illustrating a state in which a main circuit board is connected with the connector of FIG. 7.

The connecting pins 174 each contact the common connecting portion 175 before the connection with the main circuit board 160, or before the performance of a servo track writing, thus to be shorted with other connecting pins, so that the conventional short block 1 as illustrated in FIGS. 1 and 2 is not required, end therefore an additional process for removing the short block 1 can be accordingly removed. In addition, as it is not necessary to remove the short block 1, an incomplete connection with the main circuit board 160 due to curving of the connecting pins 174 can be prevented. As a result, connectivity between the connecting pins 174 and the main circuit board 160 can be improved. Further, as illustrated in FIG. 8, the connecting pins 174 contacting the main circuit board 160 are resiliently deformed while maintaining the contact state with the terminals 161, provided to the main circuit board 160, when connected with the main circuit board 160, thus to be separated from the side portion of the common connecting portion 175 in response to a external force being applied. Consequently, the shorted state between the connecting pins 174 can be released so that the connecting pins 174 can perform their original functions. Meanwhile, in the course of the separating of the connecting pins 174 from the common connecting portion 175 as discussed above, the width of the block 173 can be formed substantially identical to that of the common connecting portion 175 such that the edge portions of the hook portions 174*b* are smoothly and slidably moved from the side portion of the common connecting portion 175 to the side portion of the block 173. However, the invention is not limited to this discussed embodiment.

As described before, according to the present invention, the connecting pins are shorted together by the common connecting portion before the connection with the main circuit board, and, if connected with the main circuit board, the shorted state by the common connecting portion can be released. Thus, the conventional short block is not required so that an additional process for removing the conventional short block is accordingly not required. Further, due to not having to use, and therefore remove, the conventional short block, the incomplete connection with the main circuit board due to curving of the connecting pins can be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A connector comprising:

a bracket comprising an insulating material;

connecting pins arranged in the bracket so as to be spaced apart from one another, and comprising a conductive material; and a common connecting portion extending in a direction that the connecting pins are arranged, and comprising a conductive material;

wherein the connecting pins all contact the common connecting portion to form short circuits before an external force is applied thereto, and the connecting pins each are resiliently deformed to be spaced apart from the common connecting portion in response to the external force being applied.

2. The connector according to claim 1, wherein hook portions are provided at portions of the connecting pins at which the external force is applied, edge portions of the hook portions contact a side portion of the common connecting portion before the external force is applied to the hook portions, end the edge portions of the hook portions are separated from the common connecting portion in response to the external force being applied to the hook portions.

3. The connector according to claim 2, wherein the hook portions are formed to be partially protruded a predetermined distance from the bracket.

4. The connector according to claim 3, wherein the edge portions of the hook portions are formed to be curved.

5. The connector according to claim 2, wherein the bracket includes a block that the common connecting portion is disposed correspondingly thereto.

6. The connector according to claim 5, wherein the connecting pins are arranged in first and second rows parallel to each other, and the block is disposed between the first and second rows.

7. The connector according to claim 6, wherein a protrusion is formed to one of the common connecting portion and the block, and a groove into which the protrusion is inserted is formed on a remaining one of the common connecting portion and the block.

8. The connector according to claim 6, wherein a width of the common connecting portion is substantially identical to that of the block, and the edge portions of the connecting pins are slidably moved along the side portions of the common connecting portion and the block in response to the connecting pins being resiliently deformed by the external force.

9. The connector according to claim 6, wherein partition members are provided to the bracket such that portions of the partition members are disposed between the connecting pins.

10. A hard disk drive comprising:

a base member;

at least one disk rotatably mounted on the base member;

a head stack assembly rotatably mounted on the base member to record data on the disk and to read data recorded on the disk;

a voice coil motor to provide the head stack assembly with a rotating force using interaction with a coil provided in the head stack assembly; and a connector to connect the head stack assembly and a main circuit board controlling the same, the connector comprising:

a bracket comprising an insulating material, connecting pins arranged in the bracket so as to be spaced apart from one another, and comprising a conductive material, and a common connecting portion extending in a direction that the connecting pins are arranged, and comprising a conductive material, wherein the connecting pins all contact the common connecting portion to form short circuits before the connecting pins are connected to the main circuit board, and the connecting pins each are resiliently deformed to be spaced apart from the common connecting portion in response to the connecting pins being connected to the main circuit board.

11. The hard disk drive according to claim 10. wherein hook portions are provided at portions of the connecting pins to connect to the main circuit board, edge portions of the hook portions contact a side portion of the common connecting portion before the hook portions are connected with the main circuit board, and the edge portions of the hook portions are separated from the common connecting portion in response to the hook portions being connected with the main circuit board.

12. The hard disk drive according to claim 11, wherein the hook portions are formed to be partially protruded a predetermined distance from the bracket.

13. The hard disk drive according to claim 12, wherein the edge portions of the hook portions are formed to be curved.

14. The hard disk drive according to claim 11, wherein the bracket includes a block such that the common connecting portion is disposed correspondingly thereto.

15. The hard disk drive according to claim 14, wherein the connecting pins are arranged in first and second rows parallel to each other, and the block is disposed between the first and second rows.

16. The hard disk drive according to claim 14, wherein a protrusion is formed to one of the common connecting portion and the block, and a groove into which the protrusion is inserted is formed on a remaining one of the common connecting portion and the block.

17. The hard disk drive according to claim 14, wherein a width of the common connecting portion is substantially identical to that of the block, and the edge portions of the connecting pins are slidably moved along the side portions of the common connecting portion and the block in response to the connecting pins being resiliently deformed by the external force.

18. The hard disk drive according to claim 14, wherein partition members are provided to the bracket such that portions of the partition members are disposed between the connecting pins.

19. The hard disk drive according to claim 10, wherein the head stack assembly and the connector are connected by a flexible printed cable.

* * * * *

UNITED STATES PATENT AND TRADEMARK OFFICE

CERTIFICATE OF CORRECTION

PATENT NO. : 7,391,588 B2

APPLICATION NO. : 11/442238

DATED : June 24, 2008

INVENTOR(S) : Kyoung-man Cho et al.

It is certified that error appears in the above-identified patent and that said Letters Patent is hereby corrected as shown below:

Column 7, Line 15, change "claim 10." to --claim 10,--.

Signed and Sealed this

Twenty-eighth Day of October, 2008

JON W. DUDAS

*Director of the United States Patent and Trademark Office*